United States Patent
Brown (10) Patent No.: US 8,775,813 B2
(45) Date of Patent: Jul. 8, 2014

(54) ELGAMAL SIGNATURE SCHEMES

(75) Inventor: Daniel Richard L. Brown, Mississauga (CA)

(73) Assignee: Certicom Corp., Mississauga, Ontario (CA)

(*) Notice: Subject to any disclaimer, the term of this patent is extended or adjusted under 35 U.S.C. 154(b) by 436 days.

(21) Appl. No.: 12/714,116

(22) Filed: Feb. 26, 2010

(65) Prior Publication Data

US 2011/0213982 A1    Sep. 1, 2011

(51) Int. Cl.
*H04L 9/32* (2006.01)
*H04L 9/28* (2006.01)
*G06F 21/00* (2013.01)

(52) U.S. Cl.
USPC ........... 713/176; 713/180; 713/171; 713/168; 713/150; 380/1; 380/277; 380/278; 380/283; 708/100; 708/200; 708/250

(58) Field of Classification Search
USPC ............. 713/176, 180, 171, 168, 150; 380/1, 380/277, 278, 283, 284, 285, 44, 45, 46, 28, 380/29, 30; 708/100, 200, 250–256, 490, 708/494, 620
See application file for complete search history.

(56) References Cited

U.S. PATENT DOCUMENTS

| | | | | |
|---|---|---|---|---|
| 5,600,725 | A * | 2/1997 | Rueppel et al. | 380/30 |
| 6,304,658 | B1 * | 10/2001 | Kocher et al. | 380/30 |
| 7,260,723 | B2 * | 8/2007 | Johnson et al. | 713/180 |
| 7,552,329 | B2 * | 6/2009 | Johnson et al. | 713/168 |
| 7,599,491 | B2 * | 10/2009 | Lambert | 380/30 |
| 7,664,810 | B2 * | 2/2010 | Crispin et al. | 708/491 |
| 7,668,310 | B2 * | 2/2010 | Kocher et al. | 380/37 |
| 2008/0005570 | A1 * | 1/2008 | Johnson et al. | 713/176 |

FOREIGN PATENT DOCUMENTS

WO    WO 2008/106793 A1    9/2008

OTHER PUBLICATIONS

{Patrick Horster and Markus Michels and Holger Petersen}, {Meta-ElGamal signature schemes using a composite module}, {1994} Proc 2 ACM Conference on Computer and Communications Security, Fairfax, Nov. 2-4, 1994, pp. 96-107.*
Messerges, Thomas S.; "Power analysis attacks and countermeasures for cryptographic algorithms"; Ph.D Dissertation; Jun. 20, 2010; pp. 1 to 234; Chicago, Illinois.
Fouque, Pierre-Alan et al.; "The Carry Leakage on the Randomized Exponent Countermeasure"; Cryptographic Hardware and Embedded Systems, CHES 2008; Aug. 10, 2008; pp. 198 to 213; LNCS; vol. 5154; Springer Berlin.

(Continued)

*Primary Examiner* — Saleh Najjar
*Assistant Examiner* — Oleg Korsak
(74) *Attorney, Agent, or Firm* — Etienne de Villiers; Dimock Stratton LLP (57) ABSTRACT

In a method of generating a digital signature of a message m, a signature component s of the digital signature is calculated by first masking the long-term private key d using a single additive operation to combine the key d with a first value. The masked value is then multiplied by a second value to obtain component s. The first value is calculated using the message m and another component of the digital signature, and the second value is derived using the inverse of a component of the first value. In this way, the signature component s is generated using a method that counters the effectiveness of side channel attacks, such as differential side channel analysis, by avoiding a direct multiplication using long-term private key d.

15 Claims, 7 Drawing Sheets

(56) References Cited

OTHER PUBLICATIONS

Billet, Olivier; Search Report from corresponding European Application No. 10154880.8; search completed Jun. 25, 2010.

Joye, Marc and Yen, Sung-Ming; "The Montgomery Powering Ladder"; Revised Papers from the $4^{th}$ International Workshop on Cryptographic Hardware and Embedded Systems—CHES 2002; Aug. 13-15, 2002; Ed. By Kaliski, Jr. et al.; pp. 291 to 302; vol. 2523; Lecture Notes in Computer Science; Springer-Verlag.

Fouque, P.A. et al.; "Fault Attack on Elliptic Curve with Montgomery Ladder Implementation"; Proceedings of the $5^{th}$ International Workshop on Fault Diagnosis and Tolerance in Cryptography; Aug. 10, 2008; pp. 92 to 98; IEEE Computer Society.

Menezes, A. et al.; Handbook of Applied Cryptography; 1997; pp. 451 to 462; CRC Press, Boca Raton, Florida.

Hankerson, D. et al; Guide to Elliptic Curve Cryptography; 2004; p. 184; Springer-Verlag, New York.

El Gamal. T.; "A public key cryptosystem and a signature scheme based on discrete logarithms"; IEEE Transactions on Information Theory; Jul. 1985; pp. 469 to 472; vol. 31, Issue 4.

\* cited by examiner

ELGAMAL SIGNATURE SCHEMES

TECHNICAL FIELD

The following relates generally to ElGamal signatures and their variants.

BACKGROUND

A cryptographic system is a computer system that uses cryptography, typically to secure or authenticate data communication between a pair of computing devices connected to one another through a data communication link in the system. Each computing device has a cryptographic unit with the processing capacity to implement one or more cryptographic protocols used to secure or authenticate the data communication. The cryptographic protocols typically perform arithmetic operations on the bit strings representing parameters, messages, or data in the protocols to produce a bit string representing the output from the protocol.

In a cryptographic system that employs a public-key scheme, each correspondent in the system utilizes a private key and a corresponding public key related to the private key by a mathematical function. The mathematical function presents a "difficult" mathematical problem to ensure that a private key of a correspondent cannot be obtained from the corresponding public key. An example of one such problem is the discrete logarithm problem over a finite field. A particularly robust and efficient public-key system based on the discrete logarithm problem makes use of points on an elliptic curve defined over a finite field. Such systems, referred to as elliptic curve cryptography (ECC) systems, offer high levels of security at faster computation time than other systems.

Public-key schemes allow for elegant signature algorithms that provide non-repudiation services. The ElGamal signature and its variants are one such group of signatures that is used in a public-key scheme based on the discrete logarithm problem. The ElGamal signature scheme and its variants are known in the art and are described, for example, in detail in Chapter 11 Section 11.5 of "*Handbook of Applied Cryptography*", Menez et al., CRC Press, 1997, incorporated herein by reference.

The ElGamal signature scheme can be summarized as follows. Consider a cryptographic system having cryptographic parameters which include an appropriate prime number p and a generator $\alpha$ of the multiplicative group $Z^*_p$. A correspondent A has long-term private key d and corresponding long-term public key $y=\alpha^d$ mod p. The computational unit of correspondent A performs the following steps to generate an ElGamal signature for a message m:

(a) select a random secret integer k, $1 \le k \le p-2$, with gcd(k, p−1)=1;
(b) compute a first signature component $r=\alpha^k$ mod p;
(c) compute $k^{-1}$ mod(p−1); and
(d) compute a second signature component $s=k^{-1}(h(m)-dr)$mod(p−1) where h(•) is a cryptographic hash function.

The signature generated is the pair (r, s).

Variations of the ElGamal signature scheme exist and are known in the art. For example, such variations include the Digital Signature Algorithm (DSA), the Schnorr signature scheme, and ElGamal signatures with message recovery. Most of these variations involve slightly different forms of what is commonly referred to as the signing equation, that is, the equation used to compute the second signature component s in step (d) above. A popular variation of the ElGamal signature scheme is the Digital Signature Algorithm (DSA).

In the DSA, the signing equation is $s=k^{-1}(h(m)+dr)$mod q, where q is the order of a cyclic group in $Z^*_p$.

In elliptic curve cryptographic systems, a commonly used signature scheme is the Elliptic Curve Digital Signature Algorithm (ECDSA). A summary of the ECDSA is as follows. Assume correspondent A has a long-term private key d and a corresponding long-term public key D=dG, where G is a base point on the curve specified in the domain parameters. G will be assumed to have prime order n. Correspondent A therefore performs the following steps to generate an ECDSA signature for a message m:

(a) select a random secret ephemeral private key $k \in_R [1, n-1]$ and calculate associated ephemeral public key K=kG;
(b) compute a first signature component $r=f(K)=\overline{x_K}$mod n where $\overline{x_K}$ is the integer representation of the first coordinate (also sometimes called the x-coordinate) of elliptic curve point K; and
(c) compute a second signature component $s=k^{-1}(h(m)+dr)$mod n where h(•) is a cryptographic hash function whose outputs have bit length no more than that of n.

The signature generated is the pair (r,s).

Cryptographic systems may be subject to side channel attacks, in which timing information, electromagnetic emissions, power usage, or other side channel information is used to try and determine a secret value utilized by the cryptographic unit during calculations. Multiplication in a computational unit of a cryptographic system is typically implemented using a series of additions. Therefore, when calculating the term dr in the signing equation, the long-term private key d is directly added to itself r times. Generally, the more operations in which long-term private key d is directly used, the greater the probability that this private key may be compromised by a side channel attack.

Moreover, interlopers who employ side channel attacks are generally aware that in generating ElGamal signatures and their variants the long-term private key d is only utilized in one step of the generation of the signature, that being in the calculation of the signature component s by way of the signing equation. Therefore, an interloper may try and use differential side channel analysis to obtain information about long-term private key d. That is, an interloper may try and obtain information from the side channel over the course of signing multiple messages and compare the differences between this information to try and obtain information about private key d. By analysing the differences between the information upon multiple uses of private key d (i.e. upon multiple signing operations), it may be possible to extract enough information about long-term private key d to compromise its secrecy. The more operations in which long-term private key d is directly used in each signing operation, the greater the probability that differential side channel analysis may compromise private key d.

BRIEF DESCRIPTION

Exemplary embodiments will now be described by way of example only with reference to the accompanying drawings, in which.

DETAILED DESCRIPTION

In general terms, the following provides methods and systems for countering side channel attacks on a correspondent that generates signatures, including ElGamal signatures and their variants. This is achieved by configuring the processing unit of the correspondent to mask the long-term private key d using a single additive operation (addition or subtraction), and then using this masked value in a multiplicative operation to calculate the signature component s. This avoids having to directly multiply long-term private key d with another value, thereby making it more difficult for an interloper to determine information about the long-term private key d through a side channel attack such as differential side channel analysis.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that that any module, component, or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

Figure 1:
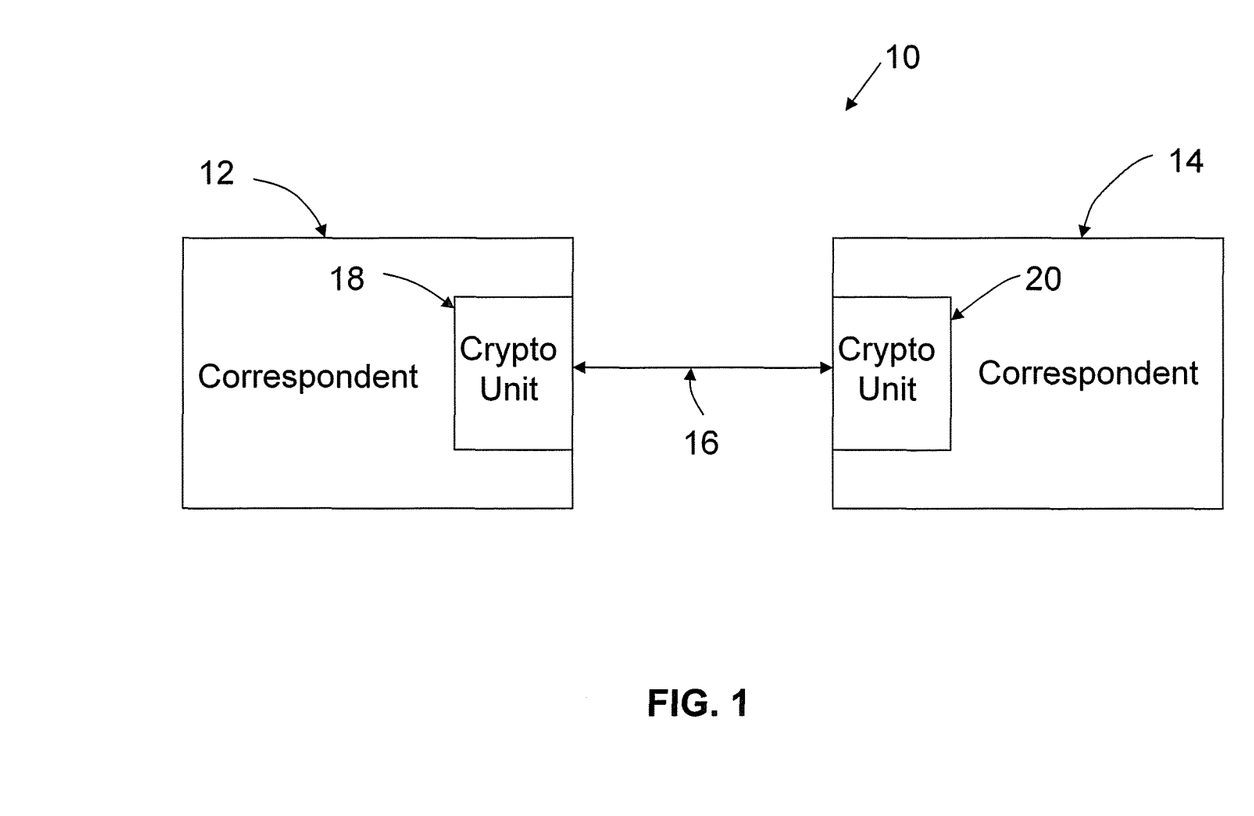
FIG. 1 is a schematic of a cryptographic communication system.
Figure 2:
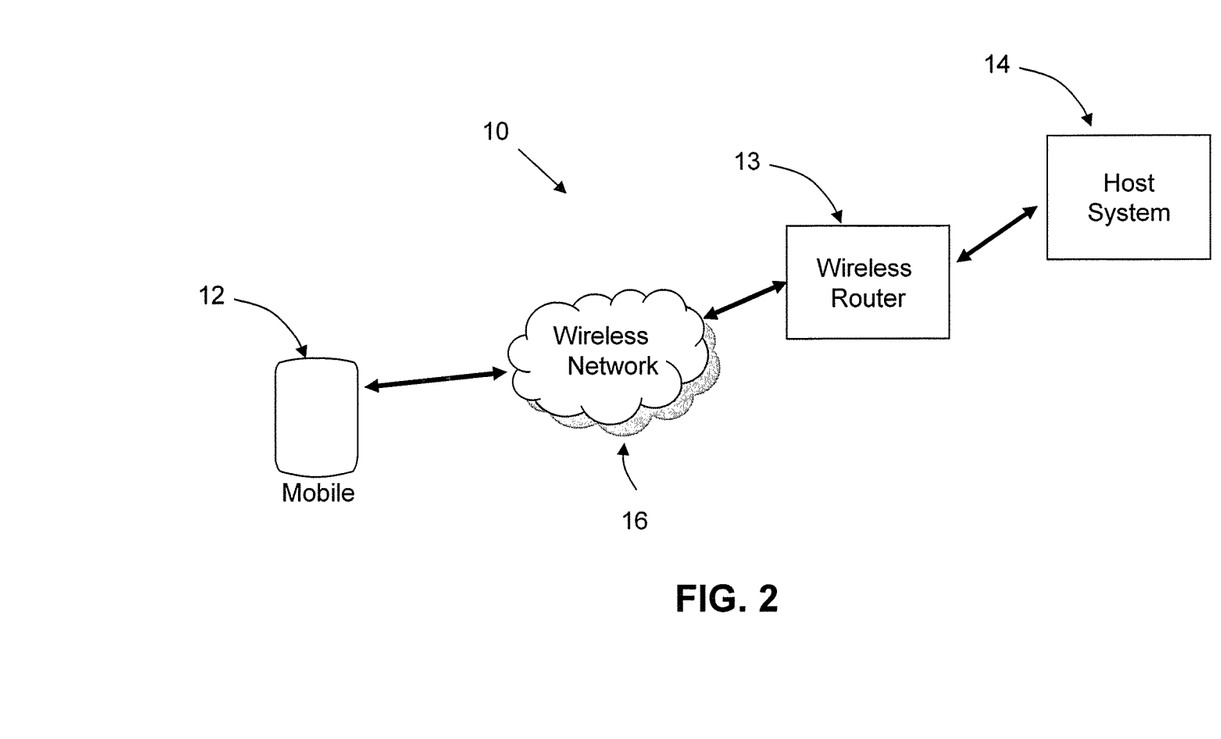
FIG. 2 is a schematic of one specific example of the communication system of FIG. 1.

Turning first to FIG. 1, a cryptographic data communication system is generally denoted by numeral 10. The system 10 has a first correspondent 12 and a second correspondent 14, which are typically a pair of computing devices, such as a client/server, a pair of computers, or a pair of mobile devices, who communicate with each other over a communication channel 16. FIG. 2 shows one specific implementation of the data communication system 10 of FIG. 1 in which the correspondent 12 is a mobile device, the correspondent 14 is a corporate enterprise computer system (host system), and the communication channel 16 is a wireless network. In the embodiment shown in FIG. 2, the host system 14 provides a host service that offers push-based messages for mobile device 12. The host service is capable of notifying and presenting data to the user in real-time at the mobile device 12 when the data arrives at the host system 14. The wireless router 13 provides the wireless connectivity functionality as it acts to both abstract most of the wireless network's complexities, and it also implements features necessary to support pushing data to the mobile device 12. Although not shown, a plurality of mobile devices may access data from the host system 14.

The embodiment shown in FIG. 2 is one specific implementation. More generally, and returning to FIG. 1, correspondents 12 and 14 are a pair of computing devices that each have a cryptographic unit 18 and 20 respectively to implement cryptographic protocols and associated arithmetic operations based on an underlying group. The cryptographic unit 18 of correspondent 12 is shown in greater detail in FIG. 3, it being understood that the cryptographic unit 20 of correspondent 14 will have similar functionality.

Figure 3:
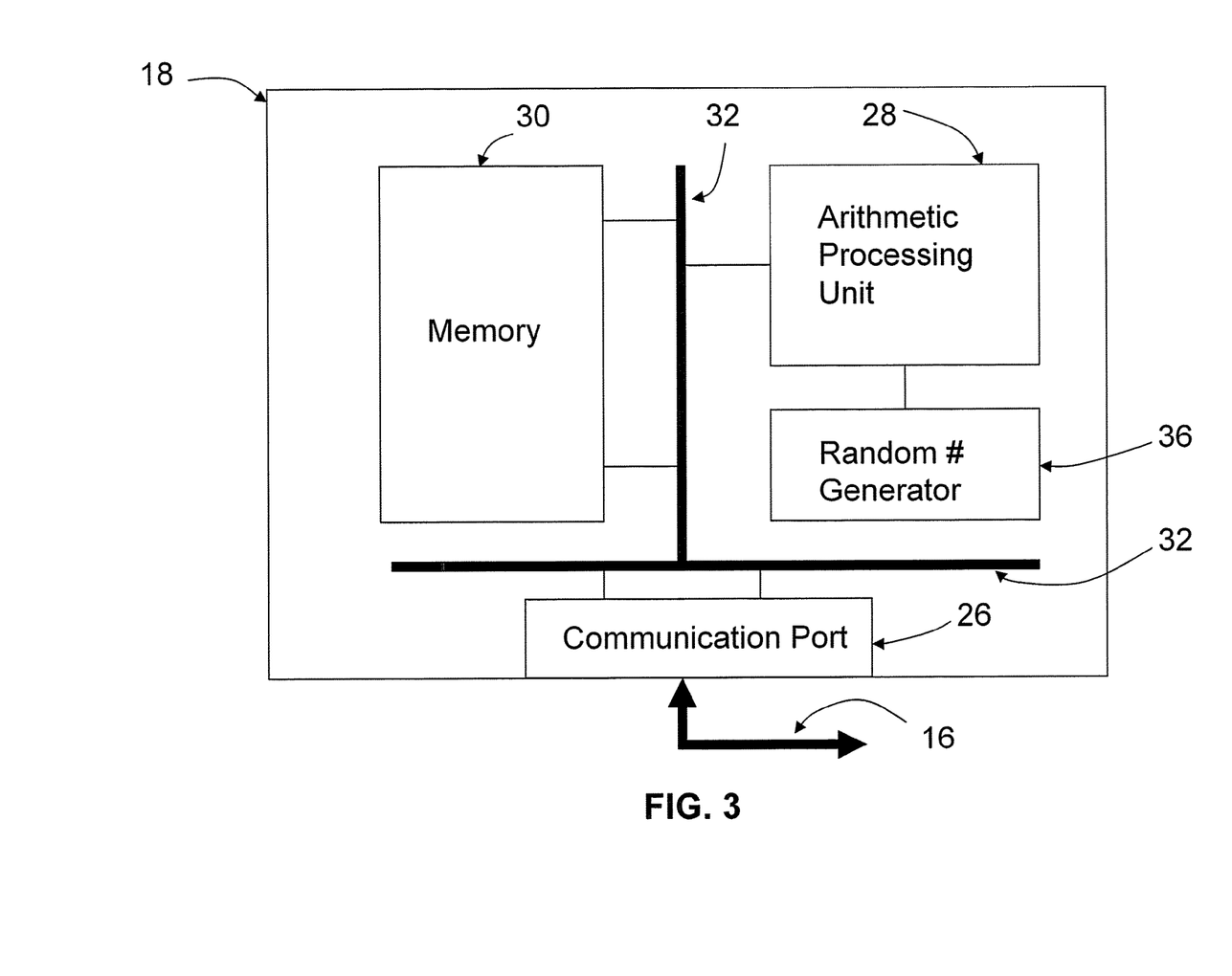
FIG. 3 is a schematic of a correspondent operating in the cryptographic communication system of FIG. 1.

Cryptographic unit 18 comprises a communication port 26 for communicating with correspondent 14 over communication channel 16, and an arithmetic processing unit 28 for performing cryptographic operations. The arithmetic processing unit 28 can comprise hardware, computer readable software instructions, or a combination of both, that is configured to perform cryptographic operations such as those described in detail below. Associated with arithmetic processing unit 28 is a random number generator 36 for generating random values for use in signing operations, as will also be described in detail below. The cryptographic unit 18 further includes a memory 30 for storing the results of cryptographic operations performed by the processing unit 28, as well as for storing information received via the port 26. Stored in a secure partition of the memory 30 is the long-term private key d of correspondent 12. Internal buses 32 are used by correspondent 12 for communicating information internally.

During operation, correspondent 12 wishes to generate a digital signature for a message m to be sent to correspondent 14. Therefore, turning to FIG. 4, an embodiment of a method of generating a digital signature is shown. The method generally comprises the following steps. In step 102, the processing unit 28 of correspondent 12 obtains an ephemeral private key and derives a first signature component using the ephemeral private key. Next, in step 104, the processing unit 28 of correspondent 12 generates a second signature component by performing operations shown in substeps 104a-d.

Figure 4:
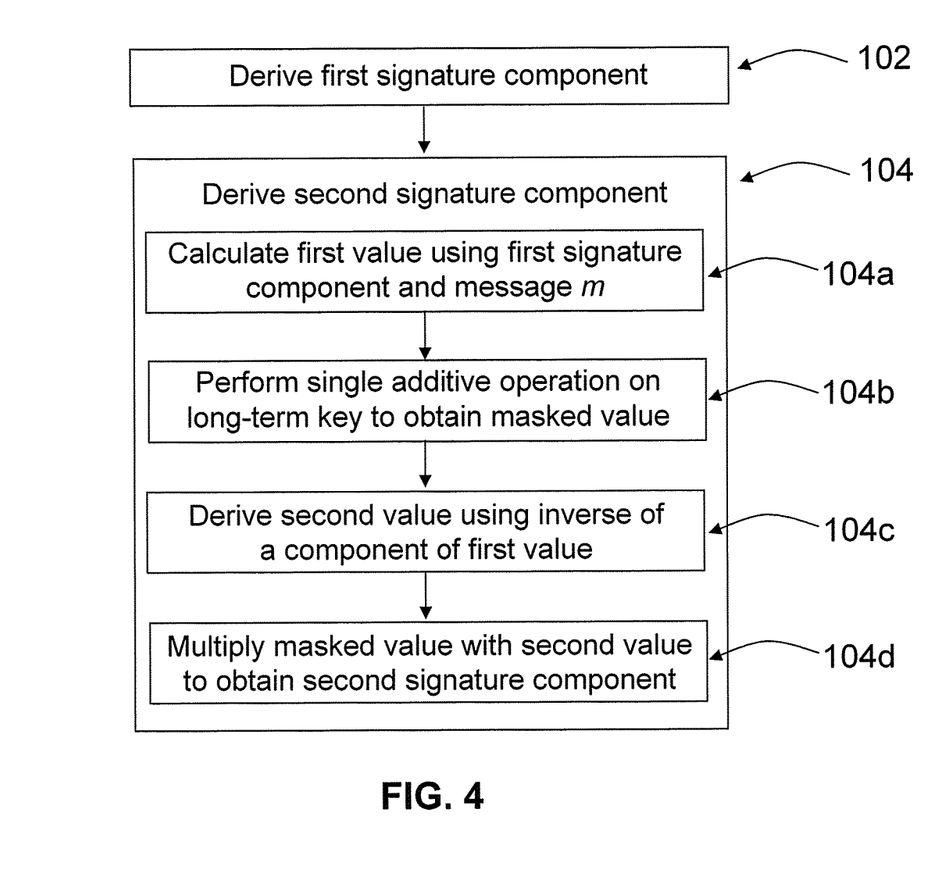
FIG. 4 is a schematic of an embodiment of a method of generating a digital signature in which the signing operation has a reduced number of operations directly involving the long-term private key.

In substep 104a, processing unit 28 calculates a first value using the first signature component and the message m. Then, in substep 104b, the processing unit 28 obtains a long-term private key from memory 30 and performs a single additive operation on the long-term private key to combine the long-term private key with the first value to obtain a masked value. Next, in substep 104c, the processing unit 28 derives a second value using an inverse of a component of the first value. Finally, in substep 104d, the processing unit 28 multiplies the masked value with the second value to obtain the second signature component. The signature comprises the first signature component and the second signature component.

Advantageously, in the method described in FIG. 4, the long-term private key is masked using a single additive operation. Once the long-term private key is masked, exposure of the key is inhibited in subsequent operations.

Figure 5:
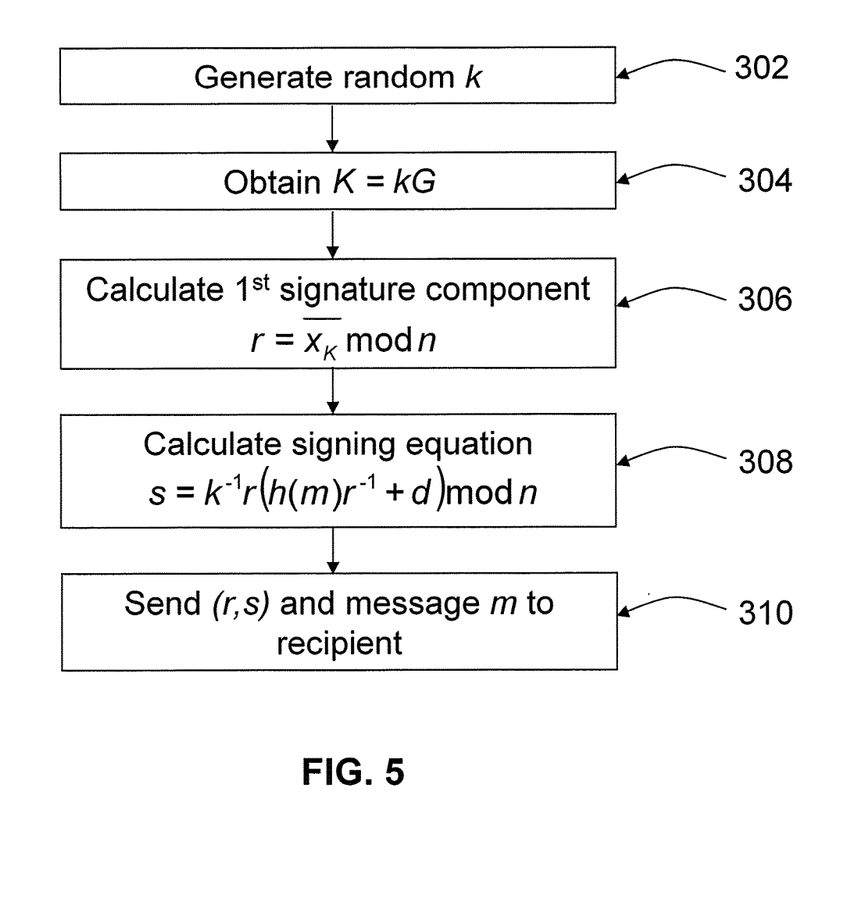
FIG. 5 is a schematic of another embodiment of a method of generating a digital signature in which the signing operation has a reduced number of operations directly involving the long-term private key.

Specific embodiments will now be described in the context of particular signature schemes. Turning therefore to FIG. 5, an embodiment of a method will now be described in which the cryptographic unit 18 of correspondent 12 operates on a message m to generate a signature (r, s) that is verifiable using the ECDSA protocol. The signing operation used to generate signature component s is performed by the processing unit 28 as described below in order to counter side channel attacks that attempt to compromise long-term private key d.

First, in step 302, the random number generator 36 generates a bit string representing a random number $k \in_R [1, n-1]$, which is used as the ephemeral private key in the signature generation portion of the ECDSA. Next, in step 304, the processing unit 28 obtains the ephemeral private key k and performs a point multiplication on a bit string representing the generator G of the underlying group to obtain the corresponding ephemeral public key as $K = kG$. Preferably, K is calculated using a Montgomery Ladder as is known in the art. Then, in step 306, processing unit 28 derives a first signature component r of signature (r, s) as $r = f(K) = \overline{x_K} \pmod{n}$, where $\overline{x_K}$ is the integer representation of the first coordinate of elliptic curve point K. Next, in step 308, the processing unit 28 computes the signing equation s. That is, the processing unit 28 generates the second signature component s of signature (r, s). The processing unit 28 is configured to calculate the signing equation s by first masking the long-term private key d using a single addition of the key d with another value, and then using this masked value in a multiplicative operation. Specifically, the processing unit 28 performs operations on bit strings modulo n to compute signing equation s as $s = k^{-1} r(h(m)r^{-1} + d) \pmod{n}$. In calculating s, processing unit 28 calculates a first value $h(m)r^{-1} \pmod{n}$. It then obtains private key d from memory 30 and adds d to $h(m)r^{-1}$ to obtain the masked value $h(m)r^{-1} + d \pmod{n}$. Then, processing unit 28 multiplies the masked value $h(m)r^{-1} + d \pmod{n}$ by $k^{-1} r \pmod{n}$ to obtain $s = k^{-1} r(h(m)r^{-1} + d) \pmod{n}$.

It will be observed that $s = k^{-1} r(h(m)r^{-1} + d) \pmod{n}$ produces the same value for s as the conventional ECDSA signing equation $s = k^{-1}(h(m) + dr) \pmod{n}$, but that in calculating $s = k^{-1} r(h(m)r^{-1} + d) \pmod{n}$ only a single additive operation is performed directly using long-term private key d, that being the addition $h(m)r^{-1} + d \pmod{n}$. This is advantageous over calculating the multiplication $dr \pmod{n}$, which involves directly adding d to itself r times. By reducing the number of operations that directly utilize long-term private key d, it is less likely that an interloper will be able to obtain information about long-term private key d through a side channel attack.

For further enhanced resistance against side channel attacks, each multiplication performed by the processing unit 28 in calculating the signing equation can be performed using a Montgomery ladder.

After signature (r, s) is generated, finally, in step 310, correspondent 12 forwards signature (r, s) and message m to correspondent 14 using the communication port 26.

In the embodiment described with reference to FIG. 5, the cryptographic unit 18 is configured to generate signatures verifiable using the ECDSA protocol. However, it will be appreciated that the technique above can be applied to other ElGamal signature schemes or their variants, regardless of whether or not elliptic curve cryptographic operations are being performed. More generally, for any signature scheme that involves the computation of a signature component s and that utilizes the long-term private key d and the direct multiplication of d with another value, the processing unit 28 can be configured to calculate an alternative form of the signing equation in which the long-term private key d is first masked by combining the long-term private key d with another value using a single additive operation (an addition or subtraction), and then using this masked value in a multiplicative operation to obtain the signature component s.

Figure 6:
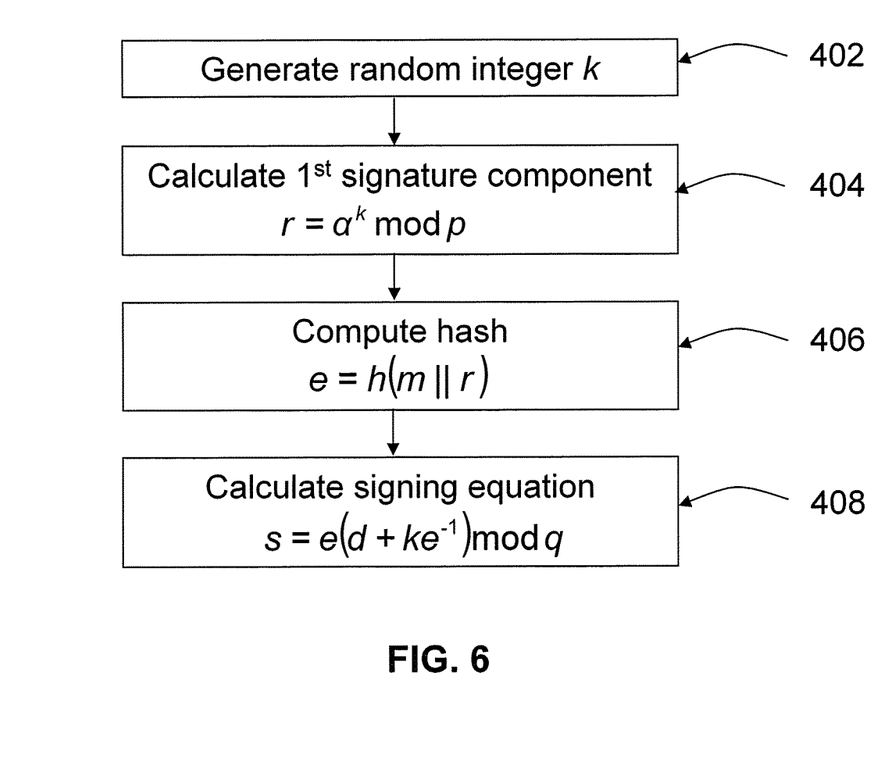
FIG. 6 is a schematic of yet another embodiment of a method of generating a digital signature in which the signing operation has a reduced number of operations directly involving the long-term private key.

For example, turning to FIG. 6, an embodiment of a method will now be described in which cryptographic unit 18 of correspondent 12 generates a digital signature (e, s) for a message m that is verifiable by correspondent 14 using the Schnorr signature scheme protocol. The signing operation to generate signature component s is performed as described below in order to counter side channel attacks that attempt to compromise long-term private key d.

First, in step 402, the random number generator 36 generates a bit string representing a random secret integer k, $1 \leq k \leq q - 1$, where q is the order of a subgroup in $Z^*_p$, and where p is a large prime number. The secret integer k can be considered to be the ephemeral private key in the signature generation portion of the Schnorr signature scheme. Next, in step 404, the processing unit 28 obtains ephemeral private key k and generates corresponding ephemeral public key $r = \alpha^k \pmod{p}$, where $\alpha$ is the generator specified in the domain parameters. Preferably, r is calculated using a Montgomery Ladder as is known in the art. Then, in step 406, processing unit 28 derives the first signature component e by calculating the hash $e = h(m \| r)$. Next, in step 408, the processing unit 28 calculates the signature equation s to obtain the second signature component. The processing unit 28 is configured to calculate the signing equation s by first masking the long-term private key d using a single addition of the key d with another value, and then using this masked value in a multiplicative operation. Specifically, the processing unit 28 performs operations modulo q to generate second signature component s as $s = e(d + ke^{-1}) \pmod{q}$. In calculating s, processing unit 28 calculates a first value $ke^{-1} \pmod{q}$. It then masks key d using a single addition to add d to $ke^{-1}$, and then multiplies the masked value $d + ke^{-1} \pmod{q}$ by e to obtain $s = e(d + ke^{-1}) \pmod{q}$. Advantageously, $s = e(d + ke^{-1}) \pmod{q}$ produces the same value of s as the conventional Schnorr signing equation $s = (de + k) \pmod{q}$, but in calculating $s = e(d + ke^{-1}) \pmod{q}$ only one additive operation is performed that directly utilizes long-term private key d, that being the addition $d + ke^{-1} \pmod{q}$. This is advantageous over calculating the multiplication de (mod q), which involves directly adding d to itself e times. By reducing the number of operations that directly utilize long-term private key d, it is less likely that an interloper will be able to obtain information about long-term private key d through a side channel attack.

Figure 7:
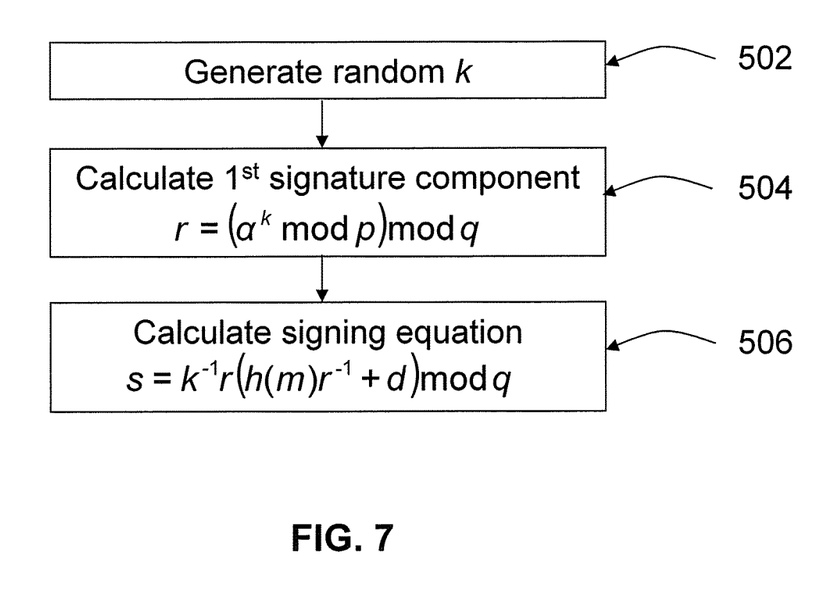
FIG. 7 is a schematic of still another embodiment of a method of generating a digital signature in which the signing operation has a reduced number of operations directly involving the long-term private key.

As another example, turning to FIG. 7, an embodiment of a method will now be described in which cryptographic unit 18 of correspondent 12 generates a digital signature (r, s) for a message m that is verifiable by correspondent 14 using the DSA protocol. However, the DSA signing operation is instead performed by the processing unit 28 as described below in order to counter side channel attacks that attempt to compromise long-term private key d.

Cryptographic unit 18 stores in its memory 30 cryptographic parameters p, q, and a, where $\alpha$ is a generator of a cyclic group of order q in $Z^*_p$. Cryptographic unit 18 accesses these parameters via the bus 32 as necessary when performing the operations described below. First, in step 502, the random number generator 36 generates a random secret integer k, $0<k<q$, which is used as the ephemeral private key in the signature generation portion of the DSA. Next, in step 504, the processing unit 28 obtains ephemeral private key k and derives first signature component r as $r=(\alpha^k \bmod p) \bmod q$. Preferably, r is calculated using a Montgomery Ladder as is known in the art. Then, in step 506, the processing unit 28 calculates the signing equation. That is, the processing unit 28 generates the second signature component s of signature (r, s). The processing unit 28 is configured to calculate the signing equation s by first masking the long-term private key d using a single addition of the key d with another value, and then using this masked value in a multiplicative operation. Specifically, the processing unit 28 performs operations modulo q to compute component s of signature (r, s) as $s=k^{-1} r(h(m) r^{-1}+d)(\bmod q)$. In calculating s, processing unit calculates a first value $h(m)r^{-1}(\bmod q)$. It then obtains private key d from memory 30 and performs a single addition to add d to $h(m)r^{-1}$ to obtain masked value $h(m)r^{-1}+d(\bmod q)$. Then, processing unit 28 multiplies masked value $h(m)r^{-1}+d(\bmod q)$ by a second value $k^-r(\bmod q)$ to obtain $s=k^{-1}r(h(m)r^{-1}+d)(\bmod q)$. Advantageously $s=k^{-1}r(h(m)r^{-1}+d)(\bmod q)$ produces the same value of s as the conventional DSA signing equation $s=k^{-1}(h(m)+dr)(\bmod q)$, but in calculating $s=k^{-1}r(h(m)r^{-1}+d)(\bmod q)$ only a single additive operation is performed directly using long-term private key d, that being the addition $h(m)r^{-1}+d(\bmod q)$. This is advantageous over calculating the multiplication $dr(\bmod q)$, which involves directly adding d to itself r times. By reducing the number of operations that directly utilize long-term private key d, it is less likely that an interloper will be able to obtain information about long-term private key d through a side channel attack.

In the embodiments described above, a series of operations are performed by the processing unit 28 to generate the signing equation s in a manner that reduces the number of operations that directly utilize long-term private key d. Specifically, in the above embodiments, the direct multiplication of long-term private key d with another value is avoided to circumvent adding long-term private key d to itself multiple times. Instead, only a single addition involving the long-term private key d is utilized to mask the long-term private key d, and then this masked value is used in a multiplicative operation to generate the signing equation s. The fewer the operations directly involving long-term private key d, the less likely an interloper will be able to derive information about long-term private key d through a side channel attack. Whist not necessary, by additionally implementing one or more of the multiplications using a Montgomery ladder, further resistance against side channel attacks can be achieved.

It will be appreciated that the technique described above can be extended to other ElGamal signature schemes or their variants, regardless of whether the underlying group is additive or multiplicative.

The following are examples of the technique as applied to the ElGamal signature scheme and some of its other variants besides those described in the figures above.

1. ElGamal: The signing equation s can be calculated by the processing unit 28 as $s=k^{-1}r(h(m)r^{-1}-d)(\bmod(p-1))$, where p is a prime number and is part of the underlying cryptographic parameters. In calculating s, processing unit 28 calculates a first value $h(m)r^{-1}(\bmod(p-1))$. It then obtains private key d from memory 30 and performs a single subtraction to subtract d from $h(m)r^{-1}$ to obtain masked value $h(m)r^{-1}-d(\bmod(p-1))$. Then, processing unit 28 multiplies masked value $h(m)r^{-1}-d(\bmod(p-1))$ by a second value $k^{-1}r(\bmod(p-1))$ to obtain $s=k^{-1}r(h(m)r^{-1}-d)(\bmod(p-1))$. Advantageously $s=k^{-1}r(h(m)r^{-1}-d)(\bmod(p-1))$ produces the same value of s as the conventional ElGamal signing equation $s=k^{-1}(h(m)-dr)(\bmod(p-1))$, but in calculating $s=k^{-1}r(h(m)r^{-1}-d)(\bmod(p-1))$ only a single additive operation is performed directly using long-term private key d, that being the subtraction $h(m)r^{-1}-d(\bmod(p-1))$.

2. A variation of ElGamal: The signing equation s can be calculated by the processing unit 28 as $s=r(d+kr^{-1}h(m))(\bmod(p-1))$. In calculating s, processing unit 28 calculates a first value $kr^{-1}h(m)(\bmod(p-1))$. It then obtains private key d from memory 30 and performs a single addition to add d to $kr^{-1}h(m)(\bmod(p-1))$ to obtain masked value $d+kr^{-1}h(m)(\bmod(p-1))$. Then, processing unit 28 multiplies masked value $d+kr^{-1}h(m)(\bmod(p-1))$ by a second value r to obtain $s=r(d+kr^{-1}h(m))(\bmod(p-1))$. Advantageously $s=r(d+kr^{-1}h(m))(\bmod(p-1))$ produces the same value of s as signing equation $s=dr+kh(m)(\bmod(p-1))$, but in calculating $s=r(d+kr^{-1}h(m))(\bmod(p-1))$ only a single additive operation is performed directly using long-teem private key d, that being the addition $d+kr^{-1}h(m)(\bmod(p-1))$.

3. Another variation of ElGamal: The signing equation s can be calculated by the processing unit 28 as $s=h(m)(d+krh^{-1}(m))(\bmod(p-1))$. In calculating s, processing unit 28 calculates a first value $krh^{-1}(m)(\bmod(p-1))$. It then obtains private key d from memory 30 and performs a single addition to add d to $krh^{-1}(m)$ to obtain masked value $d+krh^{-1}(m)(\bmod(p-1))$. Then, processing unit 28 multiplies masked value $d+krh^{-1}(m)(\bmod(p-1))$ by a second value $h(m)$ to obtain $s=h(m)(d+krh^{-1}(m))(\bmod(p-1))$. Advantageously $s=h(m)(d+krh^{-1}(m))(\bmod(p-1))$ produces the same value of s as signing equation $s=dh(m)+kr(\bmod(p-1))$, but in calculating $s=h(m)(d+krh^{-1}(m))(\bmod(p-1))$ only a single additive operation is performed directly using long-term private key d, that being the addition $d+krh^{-1}(m)(\bmod(p-1))$.

4. Generalized El Gamal: The signing equation s can be calculated by the processing unit 28 as $s=k^{-1}h(r)(h(m)h(r)^{-1}-d)(\bmod n)$, where n is the order of the underlying group. In calculating s, processing unit 28 calculates a first value $h(m)h(r)^{-1}(\bmod n)$. It then obtains private key d from memory 30 and performs a single subtraction to subtract d from $h(m)h(r)^{-1}$ to obtain masked value $h(m)h(r)^{-1}-d(\bmod n)$. Then, processing unit 28 multiplies masked value $h(m)h(r)^{-1}-d(\bmod n)$ by a second value $k^{-1}h(r)(\bmod n)$ to obtain $s=k^{-1}h(r)(h(m)h(r)^{-1}-d)(\bmod n)$. Advantageously $s=k^{-1}h(r)(h(m)h(r)^{-1}-d)(\bmod n)$ produces the same value of s as the conventional Generalized ElGamal signing equation $s=k^{-1}(h(m)-dh(r))(\bmod n)$, but in calculating $s=k^{-1}h(r)(h(m)h(r)^{-1}-d)(\bmod n)$ only a single additive operation is performed directly using long-term private key d, that being the subtraction $h(m)h(r)^{-1}-d(\bmod n)$.

5. ElGamal with Message Recovery: The signing equation s can be calculated by the processing unit 28 as $s=R(m)r(d+k(R(m)r)^{-1})(\bmod q)$, where $R(m)=e$ is the first signature component, q divides $p-1$, and p is a prime integer. In calculating s, processing unit 28 calculates a first value $k(R(m)r)^{-1}(\bmod q)$. It then obtains private key d from memory 30 and performs a single addition to add d to $k(R(m)r)^{-1}$ to obtain masked value $d+k(R(m)r)^{-1}(\bmod q)$. Then, processing unit 28 multiplies masked value $d+k(R(m)r)^{-1}(\bmod q)$ by a second value $R(m)r(\bmod q)$ to obtain $s=R(m)r(d+k(R(m)r)^{-1})(\bmod q)$. Advantageously $s=R(m)r(d+k(R(m)r)^{-1})(\bmod q)$ produces the same value of s as the conventional signing equation $s=dR(m)r+k(\bmod q)$, but in calculating $s=R(m)r(d+k(R(m)r)^{-1})(\bmod q)$ only one operation is performed directly using long-term private key d, that being the addition $d+k(R(m)r)^{-1}(\bmod q)$.

In all of the embodiments described above, the signature component s is calculated by masking the long-term private key d using a single additive operation (addition or subtraction) to combine the key d with a first value, and then the masked value is multiplied by a second value to obtain s. The first value is calculated using the first signature component and the message m, and the second value is derived using the inverse of a component of the first value. In this way, the signature component s is generated using a method that counters the effectiveness of side channel attacks such as differential side channel analysis by avoiding a direct multiplication using long-term private key d.

Although the above techniques have been described with reference to certain specific embodiments, various modifications thereof will be apparent to those skilled in the art without departing from the scope of the claims appended hereto.

What is claimed is:

1. A computing device implemented method for implementing a digital signature operation in place of a signing equation specified by a digital signature protocol, based on an underlying group, applied to a message, the method being performed by a correspondent computing device having a processing unit and memory storing a long-term private key, said protocol specifying a digital signature having a first signature component and a second signature component, said second signature component defined to be calculated by direct multiplication of said long term private key with another value, the method comprising:
   (a) the processing unit obtaining an ephemeral private key and deriving said first signature component using said ephemeral private key; and
   (b) the processing unit generating the second signature component by performing operations comprising:
      (i) calculating a first value, said calculating based on said message and including a multiplication with an inverse of said other value;
      (ii) obtaining said long-term private key from the memory and performing a single additive operation, said additive operation being one of an addition and a subtraction, on said long-term private key to combine said long-term private key with said first value to obtain a masked value;
      (iii) deriving a second value based on said other value; and,
      (iv) multiplying said masked value with said second value to obtain said second signature component,
   wherein a value of said second signature component is equivalent to a value calculated by direct multiplication of said long term private key with said other value.

2. The method of claim 1 wherein said second value is also derived using said ephemeral private key.

3. The method of claim 2 wherein said first value has the form $h(m)r^{-1}(\mod n)$, said masked value has the form $h(m)r^{-1}+d(\mod n)$, said second value has the form $k^{-1}r(\mod n)$, and said second signature component is calculated as $k^{-1}r(h(m)r^{-1}+d)(\mod n)$; wherein m is said message, r is said first signature component, k is said ephemeral private key, d is said long-term private key, h( ) represents a cryptographic hash function, and n is the order of said underlying group.

4. The method of claim 3 wherein said underlying group is an elliptic curve group, and said digital signature is verifiable using an Elliptic Curve Digital Signature Algorithm (ECDSA) verification protocol.

5. The method of claim 2 wherein said first value has the form $ke^{-1}(\mod q)$, where $e=h(m\|r)$, said masked value has the form $d+ke^{-1}(\mod q)$, said second value has the form e and said second signature component is calculated as $s=e(d+ke^{-1})(\mod q)$; wherein m is said message, e is said first signature component, k is said ephemeral private key, d is said long-term private key, h( ) represents a cryptographic hash function, and q is the order of the underlying group.

6. The method of claim 2 wherein said first value has the form $h(m)r^{-1}(\mod(p-1))$, said masked value has the form $h(m)r^{-1}-d(\mod(p-1))$, said second value has the form $k^{-1}r(\mod(p-1))$, and said second signature component is calculated as $s=k^{-1}r(h(m)r^{-1}-d)(\mod(p-1))$; wherein m is said message, r is said first signature component, k is said ephemeral private key, d is said long-term private key, h( ) represents a cryptographic hash function and p is a prime number.

7. The method of claim 2 wherein said first value has the form $kr^{-1}h(m)(\mod(p-1))$, said masked value has the form $d+kr^{-1}h(m)(\mod(p-1))$, said second value has the form r, and said second signature component is calculated as $s=r(d+kr^{-1}h(m))(\mod(p-1))$; wherein m is said message, r is said first signature component, k is said ephemeral private key, d is said long-term private key, h( ) represents a cryptographic hash function, and p is a prime number.

8. The method of claim 2 wherein said first value has the form $h(m)h(r)^{-1}(\mod n)$, said masked value has the form $h(m)h(r)^{-1}-d(\mod n)$, said second value has the form $k^{-1}h(r)(\mod n)$, and said second signature component is calculated as $s=k^{-1}h(r)(h(m)h(r)^{-1}-d)(\mod n)$; wherein m is said message, r is said first signature component, k is said ephemeral private key, d is said long-term private key, h( ) represents a cryptographic hash function, and n is the order of the underlying group.

9. The method of claim 2 wherein said first value has the form $k(R(m)r)^{-1}(\mod q)$, said masked value has the form $d+k(R(m)r)^{-1}(\mod q)$, said second value has the form $R(m)r(\mod q)$, and said second signature component is calculated as $s=R(m)r(d+k(R(m)r)^{-1})(\mod q)$, where m is said message, $R(m)r=e$ is said first signature component, $e=h(m\|r)$, k is said ephemeral private key, d is said long-term private key, h( ) represents a cryptographic hash function, q divides p−1, and p is a prime integer.

10. The method of claim 1 wherein said first value has the form $krh(m)^{-1}(\mod(p-1))$, said masked value has the form $d+krh(m)^{-1}(\mod(p-1))$, said second value has the form h(m), and said second signature component is calculated as $s=h(m)(d+krh(m)^{-1})(\mod(p-1)$; wherein m is said message, r is said first signature component, k is said ephemeral private key, d is said long-term private key, h( ) represents a cryptographic hash function, and p is a prime number.

11. The method of claim 1 wherein said ephemeral private key comprises a random value generated by a random number generator in said correspondent.

12. The method of claim 1 wherein the operation of multiplying said masked value with said second value is performed using a Montgomery ladder.

13. A computing device comprising a processor and memory, said computing device adapted to perform the method of claim 1.

14. A non-transitory computer readable medium having stored thereon computer readable instructions for performing the method of claim 1.

15. The method of claim 9 wherein $r=(a^k \mod p)\mod q$.

* * * * *